UNITED STATES PATENT OFFICE.

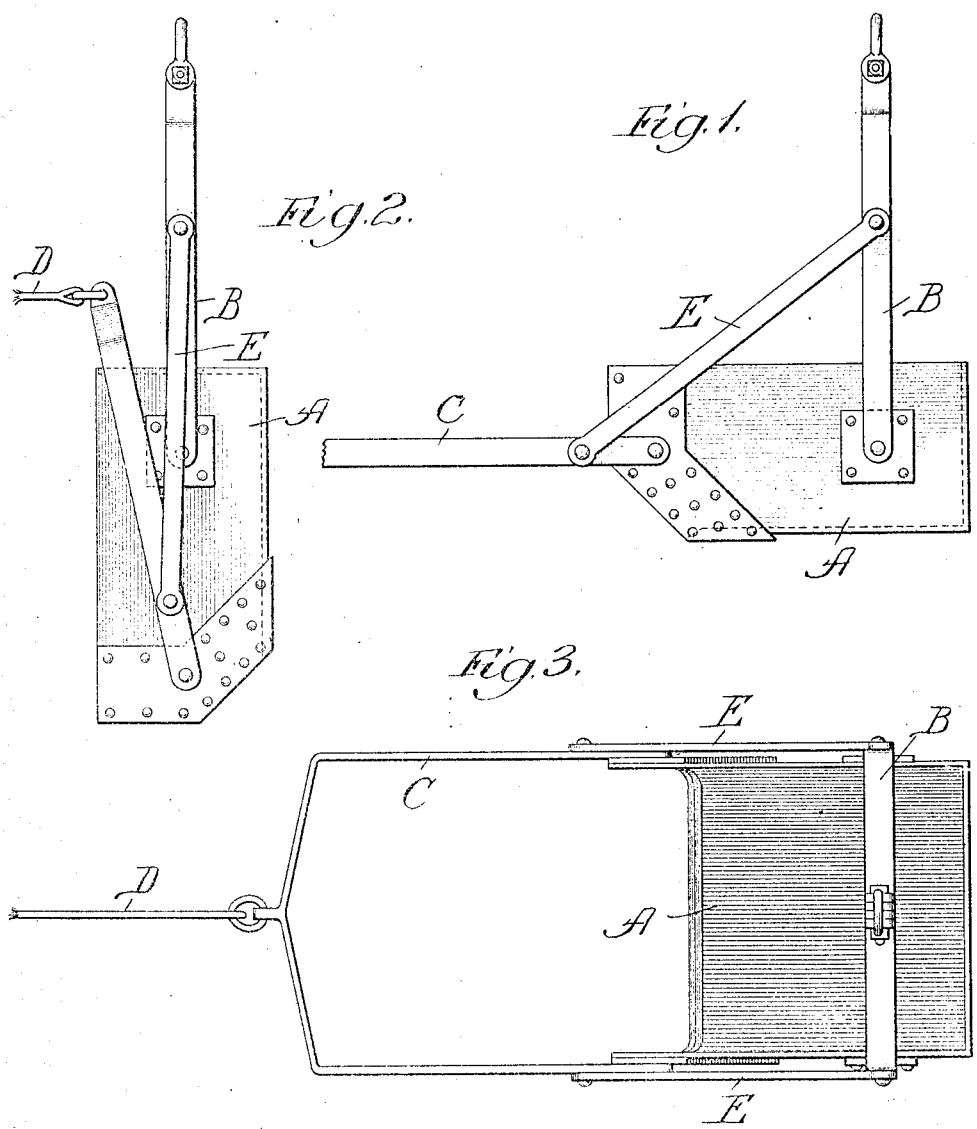

JOHN W. PAGE, OF CHICAGO, ILLINOIS.

EXCAVATING-SCOOP.

No. 916,773. Specification of Letters Patent. Patented March 30, 1909.

Application filed September 8, 1906. Serial No. 333,781.

*To all whom it may concern:*

Be it known that I, JOHN W. PAGE, a citizen of the United States, residing at Chicago, in the county of Cook, and State of Illinois, have invented a new and useful Improvement in Excavating-Scoops, of which the following is a specification.

My invention relates to improvements in excavating scoops, and is fully described and explained in this specification and shown in the accompanying drawings, in which—

Figure 1 is a side elevation of my improved device in its normal or excavating position; Fig. 2 is a similar view of the device in dumping position; and Fig. 3 is a top plan of the device.

Referring to the drawings, A is a suitable scoop having at its forward end a cutting edge, and this scoop is pivoted preferably behind its center of gravity, and a supporting bail, B, so that the shovel will normally tend to swing down to dump its contents when released. To the forward end of the shovel is pivotally secured a hauling-bail, C, adapted to be connected by means of a suitable rope D, with a suitable source of power, through the medium of which the shovel can be dragged through the material to be operated upon in the ordinary way. The supporting bail B, and the hauling-bail, C, are connected by means of a hanger, E, the pivotal point of which upon the bail, B, is above the pivot thereof and the pivotal point of which on the hauling-bail is in front of the pivot thereof.

It will be obvious that when the hauling-bail is drawn downward the pivot between the hanger, E, and the hauling-bail becomes practically a fulcrum, the hauling-bail becoming a lever of the first order, and the tendency of such downward pressure upon the bail is to force upward the front end of the shovel. In this way the shovel can be held in a horizontal position to retain its contents as long as may be desired, but upon the release of tension upon the hauling-rope the parts will immediately assume the position shown in Fig. 2, the shovel swinging downward and the contents being dumped as desired.

I claim as new and desire to secure by Letters Patent:—

1. The combination with a shovel, of a supporting bail pivoted thereto to one side of the center of gravity thereof, of a straight hauling-bail pivoted to the front of said shovel and a link pivotally secured at its ends to said bails eccentric to their pivots on the shovel.

2. The combination with a shovel, of a supporting bail pivoted thereto to one side of the center of gravity thereof, of a straight hauling-bail pivoted to the front of said shovel and a link pivoted at one of its ends to the supporting bail at a point above the pivot of said bail, and at its opposite end to the hauling-bail at a point forward of the pivot of said bail.

JOHN W. PAGE.

Witnesses:
L. HEISLAR,
J. H. LANDES.